United States Patent
Kyle

(10) Patent No.: US 6,785,895 B1
(45) Date of Patent: Aug. 31, 2004

(54) MARSHALLING INTERFACE BETWEEN PROVIDER AND SERVER

(75) Inventor: Malcolm Stewart Kyle, Corona, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/533,715

(22) Filed: Mar. 23, 2000

(51) Int. Cl.[7] .............................................. G06F 3/00
(52) U.S. Cl. ....................... 719/330; 711/217; 711/218
(58) Field of Search ................................ 711/217, 218; 719/315–318, 328–330

(56) References Cited

U.S. PATENT DOCUMENTS

| | | | |
|---|---|---|---|
| 4,922,414 A | * | 5/1990 | Holloway et al. ........... 711/207 |
| 5,212,778 A | * | 5/1993 | Dally et al. ................. 711/218 |
| 5,636,371 A | | 6/1997 | Yu |
| 5,918,252 A | * | 6/1999 | Chen et al. ................. 711/217 |
| 5,974,416 A | | 10/1999 | Anand et al. |
| 5,991,777 A | | 11/1999 | Momoh et al. |
| 6,002,852 A | | 12/1999 | Birdwell et al. |
| 6,003,024 A | | 12/1999 | Bair et al. |
| 6,088,777 A | * | 7/2000 | Sorber ........................ 711/171 |
| 6,182,202 B1 | * | 1/2001 | Muthukkaruppan ......... 711/212 |
| 6,453,383 B1 | * | 9/2002 | Stoddard et al. ............ 711/112 |

* cited by examiner

*Primary Examiner*—Meng-Al T. An
*Assistant Examiner*—Phuong N. Hoang
(74) *Attorney, Agent, or Firm*—Nathan Cass; Mark T. Starr; Lise A. Rode

(57) ABSTRACT

A request message for transfer across an interface is formed by a method comprising the steps of representing each of a plurality of data chunks to be stored in the message by a respective chunk object, declaring each of the chunk objects as a variable on a program stack, storing a first data chunk in a first area of the message; storing a second data chunk in a second area of the message; and employing the chunk object representing the first data chunk to locate the first data chunk in the course of loading into the first chunk an offset value representing the location of the second chunk, wherein the offset value represents an offset from a base address of the message. The method enables an overloaded deference operator to employ an offset stored in a chunk object on the program stack to locate a particular chunk.

38 Claims, 3 Drawing Sheets

MARSHALLING INTERFACE BETWEEN PROVIDER AND SERVER

BACKGROUND OF THE INVENTION

1. Field of the Invention

The subject invention relates generally to data processing systems and more particularly to a method and apparatus for marshalling data for transmission across an interface.

2. Description of Related Art

In the present state of the art, data is located everywhere: on mainframe servers, on PC desktops, on the web. Data resides in these environments in many different formats: relational and non-relational database management systems, ISAM files, e-mail, spreadsheets, audio, video, real time data feeds for news and stock, CAD/CAM systems, and so on.

With today's tools and software technology, there is increasing pressure to provide access to this diverse data from multiple clients using standard interfaces, without moving the data from its origin. Businesses need to build solutions that span desktops, servers, and the Internet. In addition, the end user wants to access this data in the same way, regardless of the language used.

In order to facilitate access to structured and unstructured data in such diverse locations, Microsoft Corporation has developed a software interface specification known as OLE DB. OLE DB particularly provides a set of Component Object Model (COM) interfaces. According to OLE DB, data "providers" are employed to expose data stored as OLE DB compliant data sources so as to allow access to them by OLE DB data "consumers".

One type of data provider wherein the subject invention finds use may be viewed as a two-tiered application consisting essentially of two main components denoted the "client" and the "server", which communicate with one another across a TCP/IP connection. The client sends messages called "requests" across the connection to the server, and the server returns messages called "results" across the connection to the client. Requests and results consist of strings of bytes.

Client data is stored in PC format, which means that alpha data is encoded in ASCII characters and integers are stored with their bytes in reverse order (a characteristic of the Intel processors that are used on PC's). The format of data on the host (server) is typically quite different. For example, alpha data on the host may be encoded in EBCDIC and integers may be stored with their bytes in normal order. Such encoding and storage is employed for example in Clearpath and A-Series environments present on computer systems manufactured by Unysis Corp., Blue Bell, Pa. Because of such differences between client and server data, the format of all data to be sent in requests by the client to the server must first be reformatted appropriately.

Client data is also organized in complex data structures often involving disconnected data located by pointers (memory addresses). Such data cannot simply be sent "as-is" to the server since the pointers point into the client's memory space and would be meaningless in the host environment. At the very least, the memory addresses must first be converted to relative references such that the server can use them. Also, each item must be converted to the appropriate host format, and the structures must be reorganized in a buffer as a single string of bytes. The process by which all of this is accomplished is known as "marshalling", and the buffer used is referred to as the "request buffer". The marshalling technique wherein the preferred embodiment of this invention finds application involves providing a serial string of data structures called "chunks" wherein it is desired to maintain information in one chunk as to the location of a subsequent chunk.

A number of problems arise when designing object-oriented program code to marshal such request messages. A first problem is that, in allocating a new chunk, the request buffer might have to be resized, which could, and likely would, cause the buffer to be moved to a new location in memory. Thus, conventional pointers (absolute memory addresses) cannot be used to reference subsequent chunks. A second problem is how to avoid consuming large amounts of memory on the stack when objects representing the data chunks are instantiated. As known to those skilled in the art, the "stack" is an area of memory designated to hold data required by functions of the program.

SUMMARY OF THE INVENTION

According to the invention, chunks in a request buffer are referenced by the marshalling code without pointers. This approach is implemented by using objects to represent the various data structures or "chunks" in the request message, which objects contain only (1) an offset representing the offset of a particular data structure from the start of a message and (2) a pointer to a request object. The request object, which represents the message as a whole, includes methods for reformatting data to server-compatible format. Since the objects representing the data structures need only include an offset and a pointer, they consume very little stack memory when instantiated.

Thus, according to one aspect of the invention a request message is formed by a method comprising the steps of: representing each of a plurality of data chunks to be stored in the message by a respective chunk object; declaring each of the chunk objects as a variable on the stack; storing a first data chunk in a first area of the message; storing a second data chunk in a second area of said message; and employing the chunk object representing the first data chunk to locate the first data chunk in subsequent steps. Such subsequent steps may include the loading into the first chunk of an offset representing a location in the second chunk. Thus, an offset stored on the stack is used to locate a previous chunk in order to store in that previous chunk an offset value, instead of a pointer, where the offset value represents an offset from the start of the message.

Various objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The just summarized invention will now be described in detail in conjunction with the drawings of which.

DETAILED DESCRIPTION OF AN EMBODIMENT

Figure 1:
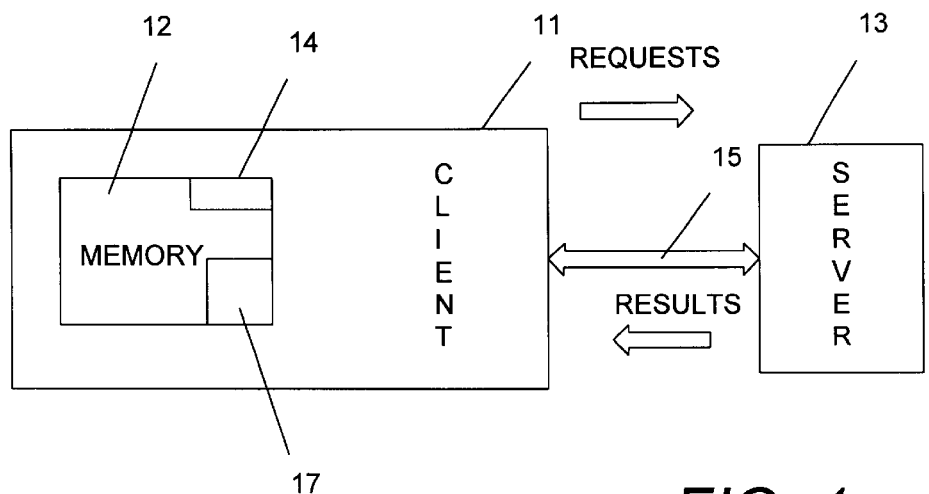
FIG. 1 is a schematic block diagram of a client-server system.

FIG. 1 illustrates an environment where a preferred embodiment of the invention finds application. This environment includes a client 11 and a server 13, which communicate with one another across a TCP/IP connection 15. The client 11 and server 13 each comprise computer controlled apparatus, as known in the art. The client 11 particularly includes memory storage space 12 wherein space is allocated for a program stack 14 and a request message buffer 17.

In operation, the client 11 sends messages called "requests" across the connection 15 to the server 13 and the server 13 returns messages called "results" across the connection 15 to the client 11. Requests and results consist of strings of bytes. A request might, for example, ask for return of all data having a certain characteristic and stored on a database forming part of the server 13.

On the client 11, data is stored in PC format, which, as noted above, means that alpha data is encoded in ASCII characters and integers are stored with their bytes in reverse order. The format of data on the host (server) 13 is typically quite different. For example, alpha data on the host 13 may be encoded in EBCDIC with integers stored with their bytes in normal order. According to the preferred embodiment, the format of data to be sent in requests by the client 11 to the server 13 is reformatted appropriately to conform to server format.

Data on the client 11 is also organized in complex data structures often involving disconnected data located by pointers. As noted above, such data cannot simply be sent "as-is" to the server 13 since the pointer addresses point into memory space of the client 11 and would be meaningless in the host 13 environment. In application of the preferred embodiment, each data item is converted to the appropriate host format and the data structures are reorganized or marshaled in a request buffer 17 as a single string of bytes.

Figure 2:
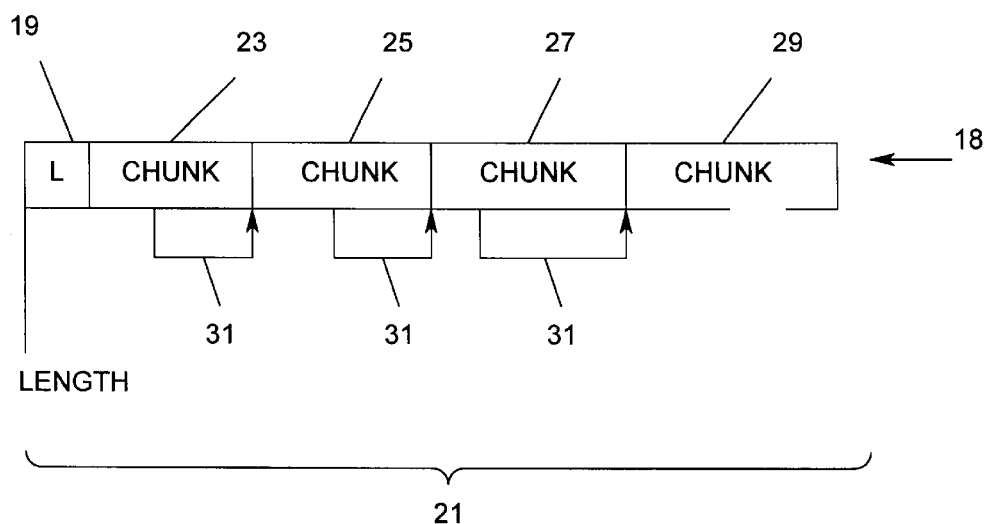
FIG. 2 is a schematic diagram illustrating the format of a request message according to the preferred embodiment.

FIG. 2 illustrates the structure of a marshaled request message 18 according to the preferred embodiment, as stored in the request buffer 17. The request buffer 17 is typically of a designated size, for example, such as 20,000 bytes of memory. The request message 18 may occupy all, or less than all, of the request buffer 17. In the request message 18, the first field is a length field 19, i.e., an integer that contains the overall length 21 in bits of the request message 18, including the length of the length field itself. The length field 19 at the start of the message 18 is filled in only at the end of message formation when the overall length of the message is known.

Following the length field 19 are the marshaled structures 23, 25, 27, 29 which, for the purposes of this disclosure, are called "chunks". Each chunk 23, 25, 27, 29 is typically described by a C++ struct that defines the fields it comprises. Chunks may also comprise less complicated structures, for example, such as strings or a simple user code. Each chunk 25, 27, 29 other than the first 23 is referenced by an offset. These references to chunks are expressed as offsets from the start of the request buffer 17.

In FIG. 2, the base of each arrow 31 that points to a chunk represents an offset from the base address of the buffer 17. Use of offsets permit various chunks to be addressed by the message building code while the message 17 is being built, as will be described in further detail below. It will also be noted that the structs themselves contain pointers to subsequent structs, which are also converted to base address offsets by the message building code.

By way of illustration, the composition of typical structs or "chunk types" are shown as follows:

```
struct a_enc_connect_req {
    unsigned char          major_release; // 8 bits [0] . [15:08]
    unsigned char          major_release; // 8 bits [0] . [07:08]
    a_enc_ptr /* a_name */ usercode; // 16 bits [1] . [47:16]
    a_enc_ptr /* a_name */ password; // 16 bits [1] . [31:16]
    unsigned char          require_login; // 8 bits [1] . [15:08]
    unsigned char          connect_filler 1; // 8 bits [2] . [07:08]
    unsigned short         codepage_higher; // 16 bits [2] . [47:16]
    unsigned short         codepage_lower; // 16 bits [2] . [31:16]
    bit 16                 connect_filler2; // 8 bits [2] [15:16]
    unsigned               char                     /*
schema_timestamp[A_WORD_SIZE];
    A-Series word * /      // 48 bits [3]
struct a_enc_plan {
    a_enc_char             action type;
    a_enc_char             action_status;
    a_enc_ptr /*a_table_ref* */   table _ref;
    a_enc_ptr /* void* */  state;
    a_enc_ptr /*plan* */   parent;
    a_enc_ptr /*plan* */   1child;
    a_enc_ptr /*plan* */   rsib;
    a_enc_ptr /*_table_ref** */   alternate_list;
    a_enc_ptr /* void* */  plan_spec; /* a_table_expression *
```

The first struct, a_enc_connect_request, contains data fields involved in an initial connection operation such as pointers to a user code and to a password located in subsequent chunks. The second struct, a_enc_plan, includes data fields comprising an encoded plan node. This struct includes an "action type" representing the action to be performed with the particular node, as well as a number of pointers to other chunks such as a_enc_ptr/*a_table_ref**/. The various pointers in these structs are changed to offsets by a procedure which employs chunk objects present on the stack to locate the particular struct.

The structure of a request message 18 for use in e.g., a Unisys A-Series environment is an array containing a six byte (A-Series word size) length field 19 followed by a collection of chunks of data, each starting at a multiple of six bytes (A-Series word size) from the base of the message 19. Each chunk is referenced by its offset in 6 byte units from the base. Note that the first chunk 23 is always at offset 1 (6 bytes from the base) since it follows the length field 19. It is not normally referenced from other chunks, although it could be. The offset denoted by "2" is 12 bytes from the base, the offset denoted by "3" is 18 bytes from the base, etc. Chunks are assigned as needed while the message is being built.

The logical contents of a message 18 in the request buffer 17 depend on the type of request being made and are described under the various classes derived from a "CRequest" base class. These derived classes may be a Connection Request class, a Fetch Request class and an Update request class, where these three derived classes respectively represent a request to connect to a particular database, a request to Fetch particular data, e.g., all rows of a particular dataset, and a request to update particular storage locations in the database.

When a message component is ready to be added to the buffer 17, a new chunk of the appropriate size is cleared and its offset from the base in six byte units is stored on the stack. As message components are inserted into the buffer 17, their contents are converted to A-Series compatible values. All integers have their bytes reversed, and ASCII text is translated to A-Series EBCDIC. After all this has been done, the message 18 is ready for interpretation by the server 13 and can be sent.

The code used to marshal a request message 18 is based on object technology. A request message 18 is represented by a request object of a class denoted herein as CRequest. The request object class (CRequest) provides the request buffer 17 as a data member and also provides methods for reformatting data for the host 13 and for building and transmitting requests to the host 13.

Figure 3:
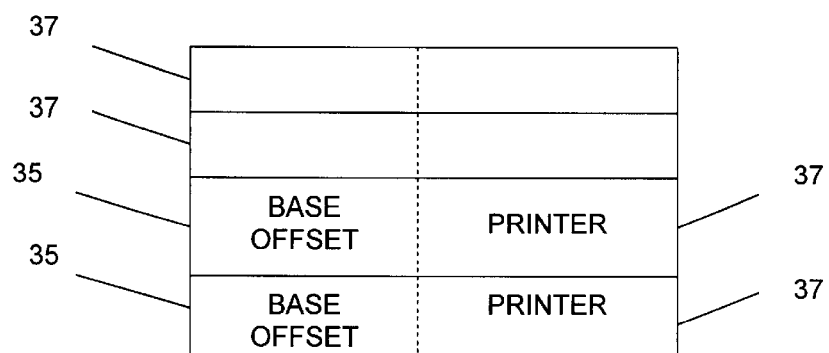
FIG. 3 is a schematic diagram illustrating chunk objects on a program stack according to the preferred embodiment.

The chunks, e.g., 23, 25, 27, 29 (FIG. 2) within a request message 18 are represented by another set of classes consisting of a base class denoted herein as CEncObject and its derived classes. The base class methods provide functions for allocating and locating chunks in the request buffer 17. As noted, there are just two data members in the base class: a pointer to the request object and an offset. Thus, the chunks in a request message 18 are represented by separately instantiated object variables on the program stack (not in the request buffer 17). As illustrated in FIG. 3, these object variables 23 each contain only two pieces of information: the base offset 35 in bytes of the data chunk represented by the object, and a pointer 37 to the request (CRequest) object.

Derived from the base class CEncObject are classes that represent each chunk type. The sole purpose of these derived classes is to overload the pointer dereference "->" operator for the particular struct that defines the particular chunk that the derived class represents. The overloaded operator uses the offset 35 of the chunk rather than a pointer to the chunk to locate the chunk. It is this feature that allows the use of offsets rather than pointers to address chunks, which means that the request buffer 17 can be resized without destroying chunk references. The other data member of the base class CEncObject, i.e., the pointer 37 to the request object, is required so that the overloaded dereference operators of the derived classes can address the request buffer 17, which is a data member of the request object, when applying the offset, as further illustrated in the code to follow. The derived classes are declared as "friends" of the CRequest class to give them the access rights they require.

Essentially then, the chunk objects are really just wrappers for the offsets of the chunks they represent. When these objects are instantiated in code, they only consume the space on the stack required to store the offset 35 and the pointer 37 to the request object. The chunks they represent are in the request buffer 17. This technique solves the second problem discussed above by minimizing the footprint of instantiated chunk objects.

The structure and operation of the preferred embodiment will now be illustrated in further detail by considering the following message marshalling code, which particularly illustrates adding space in the message 18 for a chunk called an "encoded plan", defined by the struct "a_enc_plan", and inserting the struct data into the message 18.

First of all declarations of the struct and classes are made:

```
class CRequest                          // the request object - allocated
{                                       // on the stack
   friend CEncObject;
   friend CEncPlan;
public:
   CRequest( )
   {
   m_pRequestBuffer = malloc(20000);   // establishes buffer size
   ~CRequest( )
   {
   free m_pRequestBuffer;
   }
   buildPlan( );                        // request - building methods
   unsigned short encShort (unsigned short);
   // other methods for data conversion
protected:
   unsigned char* m_pRequestBuffer;
};
struct a_enc_plan {                     // defines the chunk structure
   unsigned short fieldl;
   // other field declarations
}
class CEncObject                        // the base chunk object
{
public:
   encAlloc (int size);
   // other methods for locating chunks
protected:
   unsigned short m_offset;
   CRequest* m_RequestObject;
};
class CEncPlan : public CEncObject // the derived chunk object
{
public:
   a_enc_plan*
   operator->( )
   {
   return (a_enc_plan*)&(m_pRequestObject->m_pRequestBuffer
   [m_offset]);
   }
};
```

After the above declarations, the method, CRequest::BuildPlan( ) is written. We start by declaring an arbitrary data item (which we assume will be loaded somewhere with data) and instantiating an object of the class CEncPlan to represent the chunk to be added.

CRequest::BuildPlan( )
{
   unsigned short dataItem;
   CEncPlan plan;

Next, the object's encAlloc method is called, passing it the size of the chunk (defined by the size of the struct, a_enc_plan). This step allocates the appropriate space for the chunk at the end of the current request message 18 and saves its offset.

plan.encAlloc(sizeof(a_enc_plan));

Now data items can be encoded and copied into the fields in the plan struct, i.e., a_enc_plan, and an appropriate offset can be substituted for the pointer or pointers in a preceding chunk, using a "set-offset" method to allocate space and the object of the preceding chunk on the stack to locate that preceding chunk Thus, the objects on the stack permit the code to find a particular chunk whenever that chunk may need to be accessed. Any particular field may be addressed using the overloaded dereference operator.

For example, let's say we instantiate a CEncPlan object on the stack. We then call its enc_alloc method, which allocates the chunk space in the request buffer 17. We can now address the individual fields in the chunk (as defined by its struct) using the object's overloaded -> operator as in the following code fragment:

```
CEncPlan Plan;                              // declare a plan object
Plan.enc_alloc( . . . )                     // Allocate space for its chunk
                                               in the request buffer
Plan->action_type=<action type value>       // Assign data to the
                                               fields in the chunk
Plan->action_status=<action status value>
```

The feature of primary importance is that these assignments use the offset of the chunk, not a pointer to the chunk, because of the overloaded -> operator. (The -> operator normally uses a pointer.)

From the foregoing, it will be appreciated that, before chunks are added to a request message, the objects that represent them are declared as variables on the stack. To add a chunk to the request message, the enc_alloc method of its object is called. This allocates space for the chunk in the buffer 17 and saves its offset. The purpose of these objects is to allow the chunks they represent to be addressed using the offsets rather than pointers.

Figure 4:
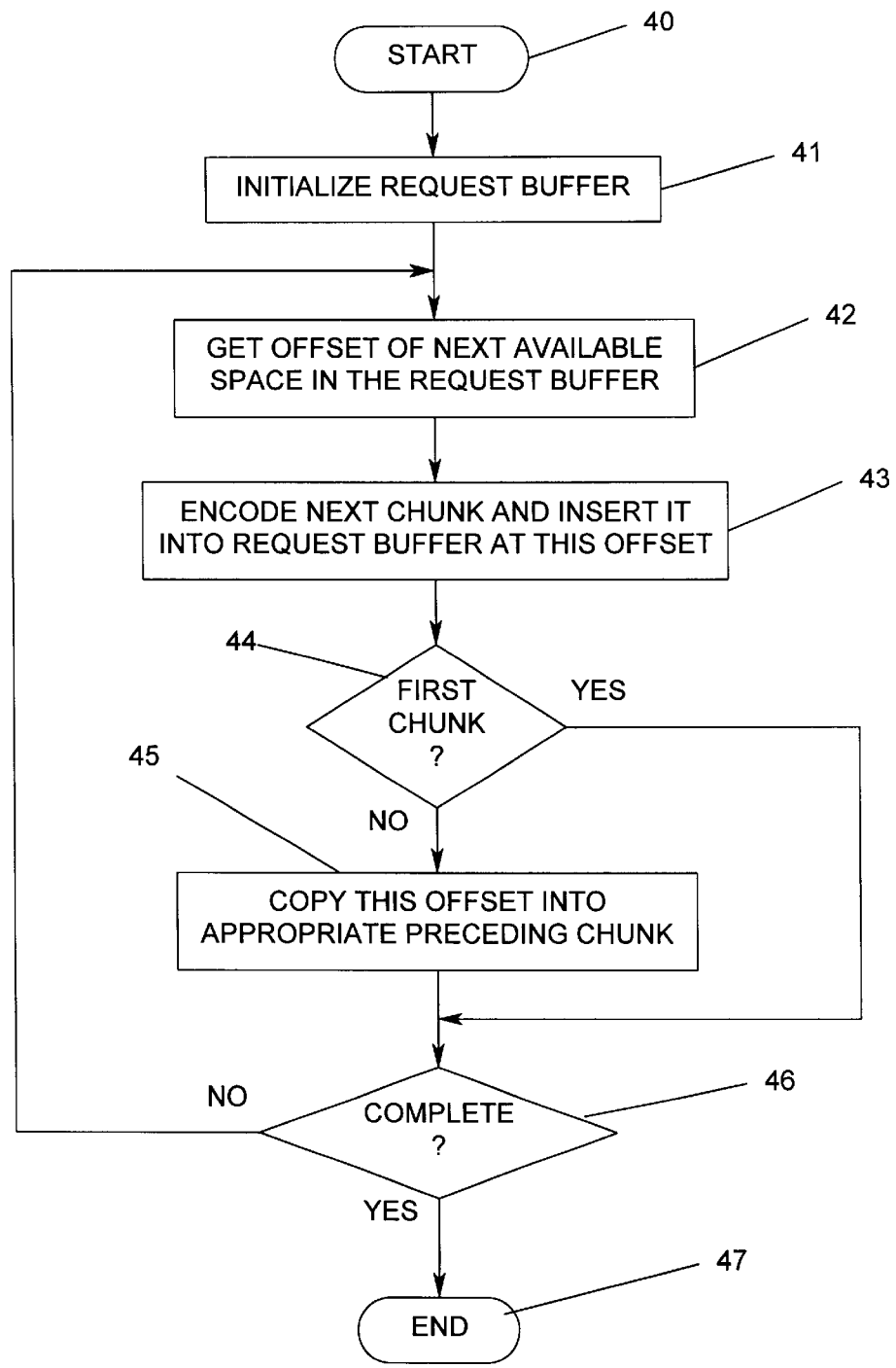
FIG. 4 is a flow chart of a recurring process for building chunks in the request buffer, which includes the method of the present invention.

Referring now to FIG. 4, a recurring process for building chunks in the request buffer is shown. The process starts with a bubble 40 followed by a step of initializing the request buffer (block 41). Next, the offset of the next available space in the request buffer is obtained (block 42) followed by a step of encoding the next chunk and inserting it into the request buffer at this offset (block 43). After this an inquiry is made as to whether or not this is the first chunk (diamond 44). If the answer to this inquiry is no, then a step of copying this offset into the appropriate preceding chunk is made (block 45). On the other hand, if the answer to the inquiry in the diamond 44 is yes, then block 45 is skipped and another inquiry is made as to whether or not the process is complete (diamond 46). If the answer to this inquiry is no, then a return is made back to the process step depicted by the block 42. On the other hand, if the answer to the inquiry in the diamond 46 is yes, then the process ends (bubble 47).

Figure 5:
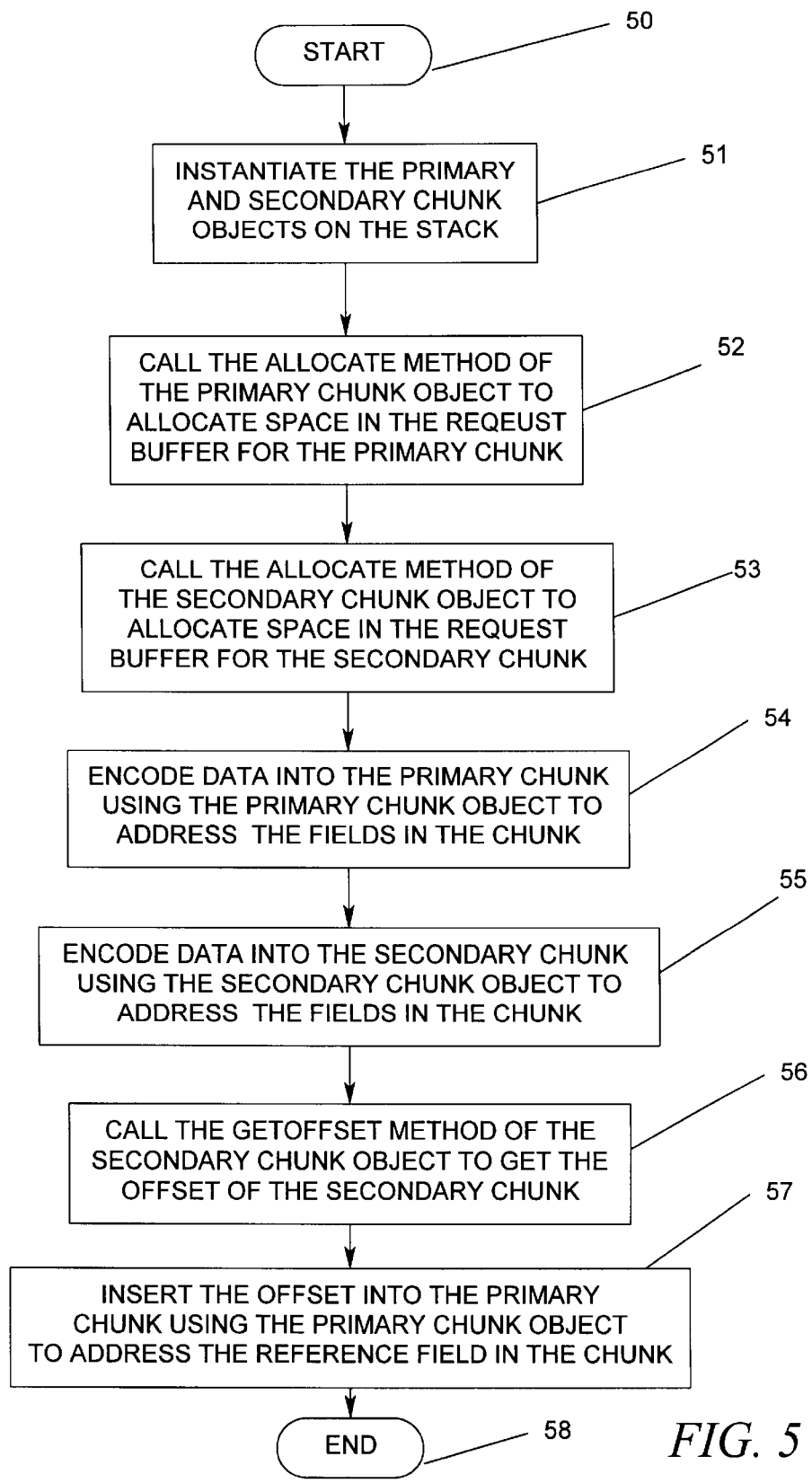
FIG. 5 is a flow chart of the method of the present invention.

Referring now to FIG. 5, the process of the present invention is shown in flow chart form. To illustrate the process, consider as an example two chunks—one containing a field that references the other. The referencing chunk is referred to as the primary chunk and the referenced chunk the secondary chunk. The process begins with a start bubble 50. Next, the primary and secondary chunks are instantiated on the stack (block 51). After this, the allocate method of the primary chunk object is called to allocate space in the request buffer for the primary chunk (block 52). The allocate method of the secondary chunk object is then called to allocate space in the request buffer for the secondary chunk (block 53).

Following the above, data is encoded into the primary chunk using the primary chunk object to address the fields in the chunk (block 54); and, data is also encoded into the secondary chunk using the secondary chunk object to address the fields in the chunk (block 55). Next, the GetOffset method of the secondary chunk object is called to get the offset of the secondary chunk (block 56). Finally, the offset is inserted into the primary chunk using the primary chunk object to address the reference field in the chunk (block 57), and then the process ends (bubble 58).

Those skilled in the art will appreciate from the illustrative use of Plan objects and structs in the above discussion, that the preferred embodiment finds application in a messaging approach known as Plan technology wherein a tree structured collection of nodes called a plan is employed to represent an OLE DB Interface query.

As those skilled in the art will further appreciate, the methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

From the above description, those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A method for use in marshalling data for transfer across an interface comprising the steps of:

defining a request message buffer comprising a series of data structures, each of said data structures including a length field and a plurality chunks, a first of said chunks including a reference to the location in the request message buffer of a second of said chunks, said reference comprising an offset value which represents a quantity by which the beginning of said second chunk is offset from the base address of the request message buffer; and representing each respective chunk of the request message buffer by an object variable, each object variable comprising two pieces of information: the offset value of the respective chunk and a pointer to a request object.

2. The method of claim 1 wherein each said chunk is represented by a base class having two data members: a pointer to a request object and an offset.

3. The method of claim 2 wherein the definition of said base class includes a method for allocating appropriate space in the request message buffer for a chunk.

4. The method of claim 2 further including a plurality of derived classes deriving from said base class, each derived class representing a particular chunk type.

5. The method of claim 4 wherein each derived class provides an overloaded pointer deference operator which allows the component fields of an associated chunk to be referenced individually using the offset of the particular chunk.

6. The method of claim 5 wherein the pointer to the request object enables the overloaded deference operator to address the request message buffer when applying the offset.

7. The method of claim 6 wherein the request object includes at least one method for reformatting data for a host to which the data is to be transferred.

8. The method of claim 1 wherein the structure of at least one of the chunks in the request buffer is defined by a C++ struct.

9. The method of claim 1 wherein each of said object variables is stored on a program stack.

10. The method of claim 5 wherein the structure of each of said plurality of chunks in the request buffer is defined by a C++ struct.

11. The method of claim 1 wherein the offset value in said first chunk replaces a pointer.

12. A computerized method of forming a request message buffer comprising the steps of:
representing each of a plurality of data chunks to be stored in said request message buffer by a respective chunk object;
declaring each of said chunk objects as a variable on a stack;
storing a first of said data chunks in a first area of said request message buffer;
storing a second of said data chunks in a second area of said request message buffer; and
employing the chunk object representing said first data chunk to locate said first data chunk in the course of loading data representing the location of said second data chunk into said first data chunk, wherein the data representing the location of said second chunk comprises an offset from a base address, and each said chunk object further contains a pointer to a request object.

13. The method of claim 12 wherein each said data chunk is a C++ struct.

14. The method of claim 12 wherein each said chunk is represented by a base class having two data members: a pointer to a request object and an offset.

15. The method of claim 14 wherein the definition of said base class includes a method for allocating appropriate space in a request message buffer for a chunk.

16. The method of claim 15 further including a plurality of derived classes deriving from said base class, each derived class representing a particular chunk type.

17. The method of claim 16 wherein each derived class provides an overloaded pointer deference operator which allows the component fields of an associated chunk to be referenced individually using the offset of the particular chunk.

18. The method of claim 17 wherein the pointer to the request object enables the overloaded deference operator to address the request message buffer when applying the offset.

19. The method of claim 18 wherein the request object includes at least one method for reformatting data for a host to which the data is to be transferred.

20. An article of manufacture comprising:
a computer usable medium having computer readable program code means embodied in said medium, the computer readable code means comprising:
means for defining a request message buffer comprising a series of data structures, each of said data structures including a length field and a plurality chunks, a first of said chunks including a reference to the location in the request message buffer of a second of said chunks, said reference comprising an offset value which represents a quantity by which the beginning of said second chunk is offset from the base address of the request message buffer; and
means for representing each respective chunk of the request message buffer by an object variable, each object variable comprising two pieces of information: the offset value of the respective chunk and a pointer to a request object.

21. The article of claim 20 wherein each said chunk is represented by a base class having two data members: a pointer to a request object and an offset.

22. The article of claim 21 wherein the definition of said base class includes a method for allocating appropriate space in the request message buffer for a chunk.

23. The article of claim 21 further including a plurality of derived classes deriving from said base class, each derived class representing a particular chunk type.

24. The article of claim 23 wherein each derived class provides an overloaded pointer deference operator which allows the component fields of an associated chunk to be referenced individually using the offset of the particular chunk.

25. The article of claim 24 wherein the pointer to the request object enables the overloaded deference operator to address the request message buffer when applying the offset.

26. The article of claim 25 wherein the request object includes at least one method for reformatting data for a host to which the data is to be transferred.

27. The article of claim 20 wherein the structure of at least one chunk in the request buffer is defined by a C++ struct.

28. The article of claim 20 wherein each of said object variables is stored on a program stack.

29. An article of manufacture comprising:
a computer usable medium having computer readable program code means embodied in said medium, the computer readable code means comprising:
means for representing each of a plurality of data chunks o be stored in a request message buffer by a respective chunk object;
means for declaring each of said chunk objects as a variable on a stack;
means for storing a first of said data chunks in a first area of said request message buffer;
means for a second of said data chunks in a second area of said message; and
means for employing the chunk object representing said first data chunk to locate said first data chunk in the course of loading data representing the location of said second data chunk into said first data chunk, wherein the data representing the location of said second chunk comprises an offset from a base address, and each said chunk object further contains a pointer to a request object.

30. The article of claim 29 wherein each said data chunk is a C++ struct.

31. The article of claim 29 wherein each said chunk is represented by a base class having two data members: a pointer to a request object and an offset.

32. The article of claim 31 wherein the definition of said base class includes a method for allocating appropriate space in a buffer for a chunk.

33. The article of claim 32 further including a plurality of derived classes deriving from said base class, each derived class representing a particular chunk type.

34. The article of claim 33 wherein each derived class provides an overloaded pointer deference operator which allows the component fields of an associated chunk to be referenced individually using the offset of the particular chunk.

35. The article of claim 34 wherein the pointer to the request object enables the overloaded deference operator to address the request message buffer when applying the offset.

36. The article of claim 35 wherein the request object includes at least one method for reformatting data for a host to which the data is to be transferred.

37. Computer executable process steps operative to control a computer and stored on a computer readable medium, said steps being operative to:

define a request message buffer comprising a series of data structures, said data structures including a length field and a plurality chunks, a first of each of said chunks including a reference to the location in the request message buffer of a second of said chunks, said reference comprising an offset value which represents a quantity by which the beginning of said second chunk is offset from the base address of the request message buffer; and represent each respective chunk of the request message buffer by an object variable, each object variable comprising two pieces of information: the offset value of the respective chunk and a pointer to a request object.

38. Computer executable process steps operative to control a computer and stored on a computer readable medium, said steps being operative to:

represent each of a plurality of data chunks to be stored in a request message buffer by a respective chunk object;

declare each of said chunk objects as a variable on a stack;

store a first of said data chunks in a first area of said request message buffer; and employ the chunk object representing said first data chunk to locate said first data chunk in the course of performing a subsequent operation involving said first chunk, wherein the data representing the location of said second chunk comprises an offset from a base address, and each said chunk object further contains a pointer to a request object.

* * * * *